United States Patent [19]
Dear et al.

[11] Patent Number: 5,597,985
[45] Date of Patent: Jan. 28, 1997

[54] ACOUSTICALLY INACTIVE CORRUGATED STRUCTURE

[75] Inventors: Terrence A. Dear, Elkton, Md.; Karl U. Ingard, Kittery Point, Mass.

[73] Assignee: E. I. Du Pont de Nemours and Company, Wilmington, Del.

[21] Appl. No.: 450,644

[22] Filed: May 25, 1995

Related U.S. Application Data

[63] Continuation-in-part of Ser. No. 115,277, Aug. 31, 1993, abandoned.

[51] Int. Cl.$^6$ .................................................. F01N 7/08
[52] U.S. Cl. ............................... 181/227; 138/121
[58] Field of Search .................... 181/227, 228, 181/233; 138/121, 122

[56] References Cited

U.S. PATENT DOCUMENTS

| | | | |
|---|---|---|---|
| 3,234,969 | 2/1966 | du Mont | 138/121 |
| 3,572,393 | 3/1971 | Eisert | 138/121 |
| 3,605,817 | 9/1971 | Bauman et al. | 138/121 |
| 3,648,803 | 3/1972 | Heath et al. . | |
| 3,861,822 | 1/1975 | Wanger . | |
| 3,895,686 | 7/1975 | Savkar et al. . | |
| 4,756,045 | 7/1988 | Gans et al. . | |
| 4,819,970 | 4/1989 | Umehara . | |
| 4,867,269 | 9/1989 | Lalikos et al. | 181/207 |
| 5,521,340 | 5/1996 | Thawani et al. | 181/233 |

*Primary Examiner*—Khanh Dang

[57] ABSTRACT

A corrugated structure is designed by dividing a given length of a corrugated structure into a number of sections, or corrugations. The length is then divided by the number of sections to obtain a constant value which serves as a reference point for determining the varied pitches of the structure of the present invention. The varying pitch of each section is determined by adding or subtracting a variation value from the constant value to obtain a varying pitch. The variation values, and thus the varying pitches, of the sections of corrugated structure are empirically chosen. Whistles, or pure tones of noise, produced by the flow of a fluid relative to the corrugations are eliminated when the corrugated structure is designed according to three requirements: 1) the total of the pitches of a given section is approximately equal to the length of a given section; 2) no two adjacent sections can have the same pitch; 3) no two variations within a given set of sections can have the same value. A group of varying pitches can itself be repeated in the manufacture of an extended structure. Such a design is particularly useful in blow-molded or injection-molded hoses, where the repetition of the pattern of varying pitches is easily adapted to manufacturing techniques. Such hoses may be used in a variety of applications, including architectural, medical, automotive and aircraft.

4 Claims, 2 Drawing Sheets

ACOUSTICALLY INACTIVE CORRUGATED STRUCTURE

This application is a continuation-in-part of U.S. application Ser. No. 08/115,277, filed Aug. 31, 1993, now abandoned.

BACKGROUND OF THE INVENTION

1. Field of the Invention

The present invention relates to a corrugated structure, such as a hose, a corrugated sheet or a set of louvers, which does not generate pure tones of noise, or whistles, when a fluid flows relative to the structure.

2. Description of the Related Art

In an ordinary corrugated structure, the distance between adjacent corrugations (pitch) is constant along the structure. The pitch of such known corrugated structures is purposely designed to be constant in order to aid in manufacturing and to provide appropriate stiffness of the structure.

However, constant-pitch structures have a propensity to produce pure tones, or whistles, when a fluid flows in a direction such that there is a velocity component perpendicular to the corrugations. Whistles are extremely annoying, particularly when they occur in the human hearing range (20–20,000 Hz). The frequency of a pure tone produced by fluid flow relative to a corrugated structure is a function of the mean flow velocity of the fluid and the constant pitch of the corrugations, and follows the relationship:

$$f=S(V/d) \qquad (1)$$

where:

f=frequency of a pure tone, in Hertz (1/second)

S=Strouhal Number (dimensionless)

V=mean flow velocity (subsonic), in feet/second d=pitch, or characteristic dimension, of the corrugations, in feet The Strouhal Number, which is about 0.2 for subsonic flow, is empirically determined. See *Engineering Noise Control*, D. A. Bies & C. H. Hansen, Unwin Hyman Ltd., London (1988), pp. 322–324.

It has been observed that whistles produced by fluid flow relative to a corrugated structure occur over a wide range of flow velocities. Accordingly, a need exists for acoustically inactive (whistle-free) corrugated structures which are easy and inexpensive to manufacture.

SUMMARY OF THE INVENTION

Applicants' invention is based on the observed fact that if the pitch is not constant, but made to vary with position along a corrugated structure, flow-induced whistle can be eliminated over the entire range of subsonic velocities of the fluid.

Accordingly, the present invention solves the problems associated with the prior art by varying the characteristic dimension, or pitch, of a corrugated structure, thereby eliminating whistle over the entire range of subsonic velocities of the fluid.

Also, the present invention solves the problems associated with the prior art by repeating the variation of pitch within one group of corrugations in subsequent groups of corrugations along the length of the structure, thereby providing an easy and relatively inexpensive method for manufacturing corrugated structures. This method can be readily adapted to blow-molding and injection-molding techniques, since such techniques rely on repetitive patterns. This makes the present invention extremely useful in the manufacture of blow-molded or injection-molded hoses which are used, for example, in medical, architectural, automotive and aircraft applications. The present invention is particularly useful in the manufacture of blow-molded or injection-molded hoses which are used to perform aspiration in operating rooms, where elimination of whistle is essential.

To achieve the foregoing solutions and in accordance with the purposes of the invention as embodied and broadly described herein, there is provided a corrugated structure, comprising: at least one group of sections, the group of sections having a given length and comprising a plurality of corrugations, wherein the pitch between each adjacent corrugation varies and is determined by dividing the given length of the group of sections by the number of sections to obtain a constant value and adding a variation to the constant value, with each variation being different from the other variations, and further wherein the total of the varying pitches is approximately equal to the given length of the group of sections. The structure of the present invention may be particularly useful where it includes a plurality of groups of sections, and the pattern of varying pitches is the same for all the groups of sections.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred embodiments given below, serve to explain the principles of the invention.

DESCRIPTION OF TEE PREFERRED EMBODIMENTS

Reference will now be made in detail to the present preferred embodiments of the invention as illustrated in the accompanying drawings.

Figure 1:
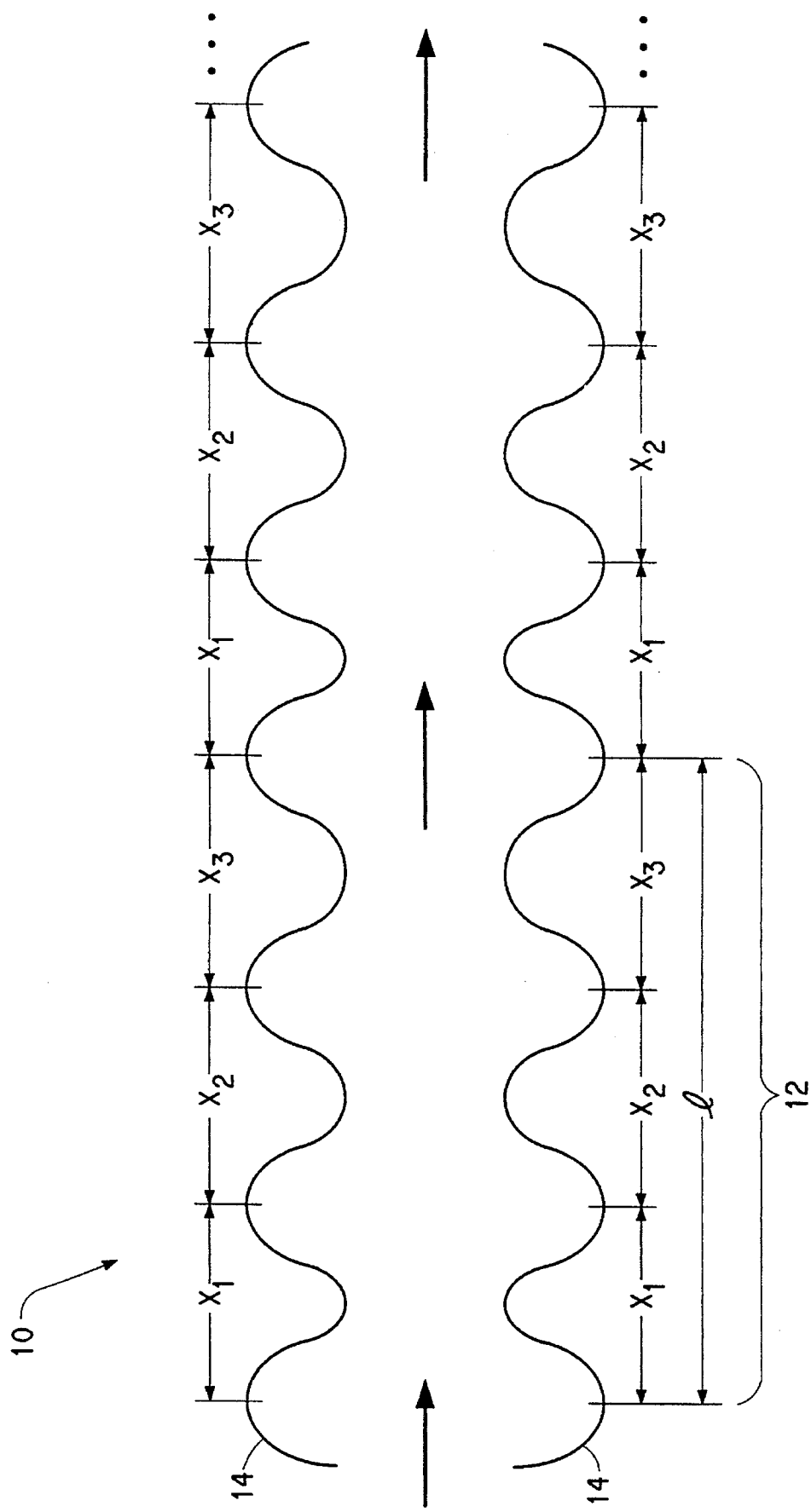
FIG. 1 is a partial, cross-sectional view of a corrugated structure, such as a tube, designed in accordance with a first embodiment of the present invention and having a plurality of groups of sections, showing how the pitch of the corrugations of a given section is varied, and how this pattern of varying pitches is the repeated for all the groups of sections.
Figure 2:
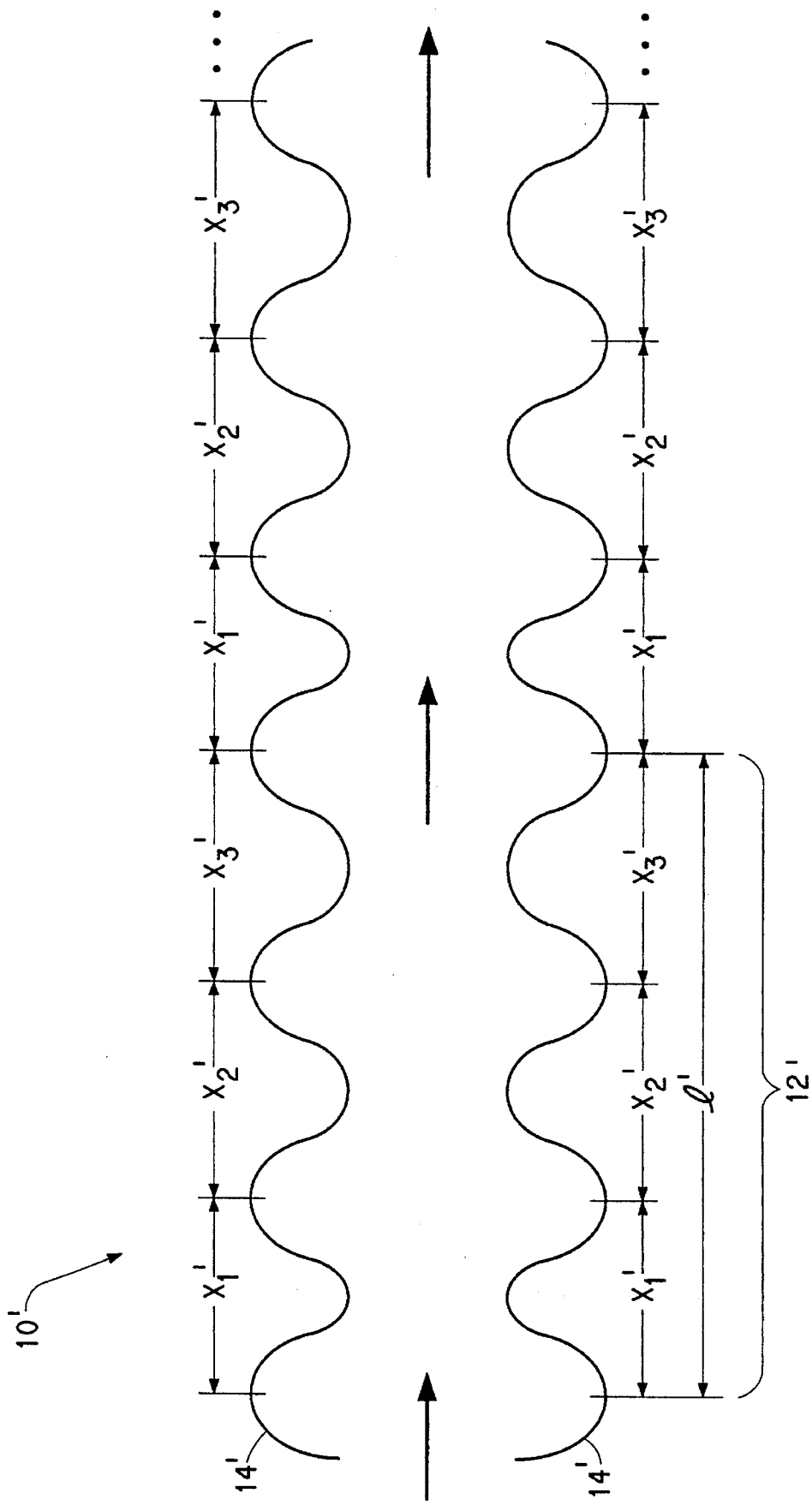
FIG. 2 is a partial, cross-sectional view of a corrugated structure, such as a tube, designed in accordance with a second embodiment of the present invention and having a plurality of groups of sections, showing how the pitch of the corrugations of a given section is varied, and how this pattern of varying pitches is the different for at least two of the groups of sections.

In accordance with the present invention, there is provided a corrugated structure having a fluid flowing relative thereto. The fluid may be either gas or liquid, or a mixture thereof, such as steam condensate. The structure may be a partially enclosed surface with at least one open end, such as a tube 10 as shown in FIG. 1 and a tube 10' as shown in FIG. 2. As shown in FIG. 1, structure 10 comprises at least one group of sections 12, the group of sections having a given length, l, and comprising a plurality of corrugations 14. As shown in FIG. 2, structure 10' comprises at least one group of sections 12', the group of sections having a given length, l', and comprising a plurality of corrugations 14'. Alternatively, the structure may be a planar, open surface, such as a corrugated roof or a set of louvers. With louvers, the corrugated structure is pervious to the flow. It will be apparent to those skilled in the art that variations can be made in the shape of the corrugations of the structure of the present invention without departing from the scope or spirit of the invention, as long as there is a substantial volume within the corrugations so that the volume communicates with the flow.

The term "pitch" as used herein is defined as the distance from any point on a corrugation to the corresponding point on an adjacent corrugation, measured parallel to the axes of the corrugations. Thus, pitch could be measured from apex to apex. For instance, in FIG. 1, the pitch of the first and second apexes, going from left to right, is $x_1$, whereas the pitch of the second and third apexes is $x_2$, and the pitch of the third and fourth apexes is $x_3$. In addition, it is within the scope of the present invention to measure the pitch from a point below the apex of a corrugation, as long as the point at which the distance is measured is consistently chosen for each pair of adjacent corrugations.

The arrows in FIGS. 1 and 2 designate the direction of fluid flow relative to the corrugations. When fluid flows relative to the corrugations, such that there is a flow component perpendicular to the corrugations, acoustic waves are created. When a sound wave travels over a corrugated structure, pressure patterns ("partial waves") are produced which travel with speeds which can be greater or smaller than the sound speed. The kinematics of this phenomenon is analogous to a rotating wheel with a stroboscopic light. The wheel appears to rotate at a speed which can be lower or higher than the actual speed, depending upon the angular velocity of the wheel and the frequency at which the stroboscopic light is operating (i.e., flashing). When the speed of a partial wave is equal to the speed component of the flow perpendicular to the corrugations, the coupling between the sound and the fluid flow is strong, and the system is likely to whistle.

When fluid flows through an open-ended corrugated tube, the resonances of the tube are likely to be excited at Mach Numbers given by the equation:

$$M = \frac{1}{1 + (m/n)(2L/d)} \quad (2)$$

where:

M=Mach Number (dimensionless)

m=1,2,3, . . . (m can be positive or negative)

n=1,2,3, . . . (n must be a positive integer)

d=pitch of the corrugations

L=length of open-ended tube, L and d having the same dimensions

Specifically, equation (2) gives the set of critical Mach Numbers in an open-ended corrugated tube at which the nth mode is potentially unstable, so that it can be excited by fluid flow as a pure tone. From equation (2), it is possible to generate a whole set of frequencies of pure tones of noise as defined by equation (1) above.

The present invention eliminates this set of pure tones of noise. Specifically, it has been found that by varying the pitch of corrugations along a given length of a corrugated structure in a manner which will be explained below, the pure tones produced over the entire range of subsonic velocities of the fluid are eliminated. This elimination of pure tones, or whistles, is particularly desirable when only air and no other materials are flowing relative to corrugations, which occurs, for example, in structures used to perform aspiration in operating rooms. In addition, the elimination of whistle is also desirable in a number of other applications which employ flexible, corrugated duct work, such as vacuum cleaners, air-handling louvers on building facades, as well as heating, ventilating and air conditioning systems in buildings, automotive vehicles and aircraft.

In accordance with the present invention, a given length, l in FIG. 1 or l' in FIG. 2, of one group of corrugations is divided into a number, n, of sections. In either the first or second embodiments, n is equal to three, although it may be any number greater than one. The length, l or l', is divided by the number of sections to obtain a constant value, c, which serves as a reference point for determining the varied pitches of the structure of the present invention. The varying pitch of each section is determined by adding or subtracting a variation value, v, from the constant value, c, to obtain a varying pitch, $P_v$. The variation values, v, and thus the varying pitches, $P_v$, of the n sections of corrugated structure are empirically chosen.

The corrugated structure of the present invention must be designed according to three requirements: 1) the total of the pitches $P_v$ of the n sections have to add up to length, l; 2) no two adjacent sections can have the same pitch, $P_v$; and 3) while the variations of the sections within the set of n sections can have the same absolute value, no two variations within a given set of sections can have the same value. Stated another way, while a certain variation, v, may be added (or subtracted) from c, the same variation may not be again added (or subtracted) within the set of n sections. A corrugated structure designed in accordance with these three requirements will not whistle. This principle holds no matter how many corrugations, or sections, a corrugated structure has. However, it should be noted that when a corrugated structure having just a few (say, for example, two) corrugations is used, it is imperative that no two adjacent sections have the same pitch.

Applicants first tried to eliminate whistle by tripping the shear layer over the first few, but not all, sections of a corrugated structure by either smoothing them out or by changing their pitch. However, this did not work, since the pure tones were excited by the periodic structure behond the first few corrugations. Thus, it is critical to the present invention that the pitch of all the corrugations of a given group of sections be varied in order to eliminate whistle.

It is possible to view a set of variations which is repeated along the length of the structure which has a plurality of groups of sections, such as that shown in FIG. 1, as an even pitch corrugated structure, where each repeated set represents an even pitch. Even with such repeated patterns, it has been found that whistle is eliminated from a corrugated structure designed according to the present invention, due to the variation of the pitches within each set of sections. This repetition lends itself to mass manufacture of corrugated structures, which has been demonstrated for blow-molding techniques, as exemplified in the Example below. However, it should be understood that it is also within the scope of the present invention to design multiple sets of sections, each of which has varying pitches, but where the pitches of at least one set are varied differently with respect to the pitches of at least one of the other sets, such as that shown in FIG. 2. In FIG. 2, the pattern for the varying pitch is $x_1'$, $x_2$, $x_3'$ in the first group of sections, but in the second group of sections it is $x_2'$, $x_3'''$, $x_1$ As can be seen from FIG. 2, the values of the varying pitches are the same as those of a different group, but their sequence is rearranged. Alternatively, the values of the varying pitches need not necessarily be the same as those of a different group, as long as their total adds up to the length for the given section.

EXAMPLE

A blow-molded, corrugated tube having a 0.2-inch internal diameter was manufactured from a copolymer of ethylene and vinyl acetate, sold under the trademark "ELVAX" by E. I. du Pont de Nemours and Company of Wilmington, Del. The pitch of the adjacent corrugations of the tube was varied along the length of the tube. A tube of the prior art having a 0.101-inch constant pitch, measured from apex to apex, was used to determine the constant value, c, (column 2). In accordance with the principles of the present invention, the pitch was varied from the constant value of 0.101 inches by a variation, v, (column 3) to determine a varying pitch, $P_v$, (column 4). The pattern of the variation of the pitch was repeated every two inches along the total length (in this case, approximately 6 ft.) of the corrugated tube for ease of manufacture. The two-inch pattern was required to meet existing requirements for blow-molding tooling and structural requirements that prevent the cross-section of the tube from closing down when the tube is bent off-axis.

The following variations were made in sequence along the direction of air flow to eliminate the generation of pure tones.

TABLE 1

| Section | Constant value, c (in inches) | Variation, v (in inches) | Varying Pitch, $p_v$ (in inches) |
|---|---|---|---|
| 1 | | | 0.101 + 0.007 = 0.108 |
| 2 | | | 0.101 + 0 = 0.101 |
| 3 | | | 0.101 + 0.005 = 0.106 |
| 4 | | | 0.101 + 0.011 = 0.090 |
| 5 | | | 0.101 + 0.006 = 0.095 |
| 6 | | | 0.101 + 0.003 = 0.098 |
| 7 | | | 0.101 + 0.002 = 0.103 |
| 8 | | | 0.101 + 0.005 = 0.106 |
| 9 | | | 0.101 + 0.009 = 0.092 |
| 10 | | | 0.101 + 0.004 = 0.097 |
| 11 | | | 0.101 + 0.001 = 0.102 |
| 12 | | | 0.101 + 0.010 = 0.091 |
| 13 | | | 0.101 + 0.005 = 0.096 |
| 14 | | | 0.101 + 0.003 = 0.104 |
| 15 | | | 0.101 + 0.008 = 0.093 |
| 16 | | | 0.101 + 0.004 = 0.105 |
| 17 | | | 0.101 + 0.008 = 0.109 |
| 18 | | | 0.101 + 0.007 = 0.094 |
| 19 | | | 0.101 + 0.006 = 0.107 |
| 20 | | | 0.101 + 0.002 = 0.103 |

Using a tube such as that described in this Example, it was noted that it is preferable for the variation, v, to be greater than 0.001 inch. The configuration for a tube as set forth in Table 1 above did not produce pure tones, or whistles, over the entire range of subsonic velocities of air. This result is explained by the fact that the pitch of each two adjacent corrugations was varied from the constant of 0.101-inch, and that this pattern was repeated every two inches along the length of the tube.

Other embodiments of the invention will be apparent to those skilled in the art from consideration of the specification and practice of the invention disclosed herein. It is intended that the specification and Example be considered as exemplary only, with the true scope and spirit of the invention being indicated by the following claims.

What is claimed is:

1. A corrugated structure, comprising: at least one group of sections, the group of sections having a given length and comprising a plurality of corrugations, wherein the pitch between each adjacent corrugation varies is determined by dividing the given length of the group of sections by the number of sections to obtain a constant value and adding a variation to the constant value, with each variation being different from the other variations, and further wherein the total of the varying pitches is approximately equal to the given length of the group of sections.

2. The corrugated structure of claim 1, wherein the at least one group comprises a plurality of groups of sections.

3. The corrugated structure of claim 2, wherein the pattern of varying pitches is different for at least two of the groups of sections.

4. The corrugated structure of claim 2, wherein the pattern of varying pitches is the same for all the groups of sections.

* * * * *